United States Patent Office 2,953,546
Patented Sept. 20, 1960

2,953,546

POLYMERIZATION OF SOLID MONOMERS IN SUSPENSION

Walter M. Thomas, Darien, Conn., and Henry Z. Friedlander, Scarsdale, N.Y., assignors to American Cyanamid Company, New York, N.Y., a corporation of Maine No Drawing. Filed Mar. 11, 1957, Ser. No. 645,026

6 Claims. (Cl. 260—72)

The present invention relates to the preparation of solid polymers. More particularly, the invention relates to a method of making polymers from monomeric materials which are solid at temperatures above about 35° C. by polymerizing the monomers in the solid state, i.e. conducting the polymerization in a liquid medium which is a nonsolvent for both the monomer and the resulting polymer. The present invention is particularly advantageous for the polymerization of solid crystalline acrylamides although the process may also be utilized with other solid vinyl monomers. The term acrylamides, as employed in the present invention, includes acrylamide as well as methylol acrylamide and mixtures thereof.

In seeking to avoid overheating such as takes place in bulk polymerization, and to avoid drying and recovery problems such as takes place in solution polymerization, prior methods have employed various techniques such as polymerizing the monomer in the form of beads. However, the bead polymerization method has the disadvantage, among others, that the beads have a tendency to stick together. Furthermore, considerable cross-linking occurs in this process.

The use of solids or crystals suspended in a nonsolvent, according to the invention, reduces the opportunity for cross-linking; lowers the dependence of the molecular weight of the product on the concentration of the initiator; omits the problem of beads sticking together; avoids the need for suspending agents; gives a powdery, easily dried product; and adds to the possibility of making crystalline polymers.

Various other techniques for preparing polymers and copolymers of the type herein discussed have been known prior to our invention, such as bulk, slurry, suspension solution and emulsion polymerizations. In the case of acrylamide, for example, it was known that homopolymeric acrylamide and many of the copolymers of acrylamide are soluble in water and could be polymerized in aqueous solutions or by emulsion polymerization methods. It has been known also that crystalline acrylamide can be polymerized by radiation, e.g. by gamma rays or by X-rays. It has also been known that polymerization of acrylamide could be conducted in a nonaqueous organic medium, such as acetone, which is a solvent for the monomer but not a nonsolvent for the polymer. In such systems, the molecular weight of the polymer produced has ben found to be undesirably low, a result which is probably due to solvent action on the monomer. Furthermore, the separation of the polymer and any residual reaction products add considerably to the expense of these procedures, lessening their commercial attractiveness. To the best of our knowledge and belief it was not known prior to our invention that solid polymerization products could be prepared in the solid state without dissolving the monomer, to form the polymer by reacting, preferably with catalyst, in a medium which is nonsolvent for both monomer and polymer.

It is an object of the present invention to prepare polymers which, although being readily soluble in water, are prepared by polymerizing the monomers in the solid state in a nonsolvent thereby greatly facilitating recovery of the solid polymeric material.

According to the present invention, we have discovered that by suspending a solid crystalline vinyl monomer in a nonsolvent for the monomer and reacting the mixture at a temperature below the melting point of the solid monomer, polymerization of the monmer takes place. Initiation preferably takes place by the addition of a catalyst as the source of free radicals. Various catalytic materials and combinations thereof may be employed such as for example Porofor N which is a trade name for azobisisobutyronitrile, benzoyl peroxide, alone or in combination with diethylaniline, acetyl peroxide, ditertiarybutylperoxide, cumene hydroperoxide, and the like.

The polymer which is formed is itself insoluble in the liquid medium permitting the solid polymer to be filtered off and dried to a free-flowing powder. The process provides a marked processing advantage as well as a highly desirable product.

Various nonaqueous liquids which may be utilized as the medium in producing the polymers according to the present invention are moderately volatile materials having a boiling point of between about 50° C. and 110° C. Among the more suitable compounds for example are hexane, cyclohexane, pentane, heptane and their mixtures. Substitued liquid hydrocarbon nonsolvents, such as carbon tetrachloride may also be employed. Suitable liquids of which the above are exemplary, are those which have the following properties: do not dissolve either the monomer or polymer; are nontoxic and inexpensive; do not substantially lower the molecular weight, i.e. are poor chain transfer agents, are volatile and therefore easily removable; and do not have a substantial swelling effect on either monomer or polymer.

The following examples in which the parts are parts by weight are set forth for the purposes of illustration only and any specific enumeration of details should not be interpreted as a limitation except as expressed in the appended claims.

*Example 1*

A suitable three-necked flask equipped with stirrer, thermometer, and Friedrichs reflux condenser is washed throughout with hot hexane. 100 parts of hexane are introduced and heating is started. 7.1 parts (0.1 mole) of twice recrystallized acrylamide crystals are then added. After a few minutes of heating, the solvent starts to reflux (B.P. 68° C., M.P. acrylamide 84.5° C.) and 0.1 part of azobisisobutyronitrile, a polymerization initiator, is added to the hexane medium. The temperature is kept at 65±1° C. After an hour, a change in appearance to flocculant particles is evident, after three hours the suspension appears characteristically milky. After four hours, the reaction is stopped. From this suspension 2.7 parts of air-dried powder is washed in a Waring Blendor in acetone for several minutes to remove any monomer and is then dried and found to have the same weight. The intrinsic viscosity of the solid polymer is 0.89.

*Example 2*

The same procedure of Example 1 is carried out except that no chemical initiator is added. When the temperature of the hexane is maintained at 58±2° C. for six hours, microscopic examination of a sample of the suspension shows no polymerization Upon heating to 66° C. a small amount of solid, insoluble in acetone, is formed within an hour. Six hours later, 6.5 parts are recovered. Of this, 1.7 parts are polymer as evidenced by being insoluble in acetone. At 0.5 percent solution the specific viscosity of the polymer produced is 1.49. The lower yield obtained in this example over that of Example 1 illustrates the advantage of using a catalyst.

*Example 3*

The procedure of Example 1 is carried out except that the passage of nitrogen through the mixture is maintained throughout the reaction. The procedure is started at room temperature with slow stirring without heating for 20 minutes before starting the reaction. The temperature is raised to 42° C. and 0.05 part of t-butyl peracetate initiator is added. Four hours later, a test shows that no polymer forms even after the temperature is raised to 55° and two additional portions each of 0.05 part of initiator are added at intervals of four hours. At the end of another four hours at 55° the test shows some polymer. After an additional three hours the temperature is raised to 62° C. and polymer continues to form over a three hour period. 6.0 parts of solid is recovered of which 1.5 parts is polyacrylamide with an intrinsic viscosity of 0.96. In testing the product to determine the amount of polymer content, a small aliquot of the suspension is placed in an excess amount of acetone. The polymer remains insoluble; the monomer dissolves easily. The object of the procedure of the foregoing examples is to determine the lowest possible temperature at which acrylamide may be polymerized.

*Example 4*

In order to determine the consequences of reaction at temperatures exceeding the melting point of the monomer, a run is performed above the melting point as a control. For this experiment heptane (B.P. 98° C.) is substituted for the hexane. The heptane is heated to reflux, about 95° C. in the same equipment described previously; then 0.1 mole of acrylamide is added (M.P. 84.5° C.). Within five minutes an obvious exotherm takes place, refluxing is heavy, and solid particles form. The heating is then stopped for ten minutes. When the reaction cools to 75°, the heating is started again. The reaction is below the melting point only for a minute or two. The reaction is continued for two additional hours at 95° C.

The product of this run is heterogeneous in size, being a mixture of fine powder, caked material, and lumps 2–5 mm. in diameter. Separation of the product is more difficult; the product swells in water, but does not dissolve sufficiently to measure its viscosity molecular weight.

*Example 5*

The procedure of Example 1 is repeated using heptane as the liquid polymerization medium instead of hexane. 10.1 parts of crystallized methylolacrylamide (0.1 mole) is introduced into the heptane. 0.1 part of azobisisobutyronitrile is added and the mixture is refluxed at about 94° C. for 5 hours. The solid polymeric product is air dried. A test portion is found to have an intrinsic viscosity of 0.79.

*Example 6*

Utilizing the apparatus of Example 1, which has been previously washed with hot hexane, 11.1 parts (0.1 mole) of calcium acrylate monomer is introduced with rapid stirring into the reaction vessel containing 150 parts of hexane. 0.1 part of Porofor N is then added and the mixture is refluxed (98° C.) while stirring for 16½ hours. The reaction mixture is then filtered and dried overnight at 70° C. The polymer yield is about 3.6% as determined by the amount of insoluble material in water, i.e. the monomer which is substantially soluble in water contains 0.014 part insoluble material whereas the polymer contains 0.41 part material.

*Example 7*

The procedure of Example 6 is repeated using in place of the calcium acrylate, 11.0 parts (0.1 mole) of potassium acrylate. The reaction is continued at reflux (98° C.) for 4 hours. The reaction mixture is filtered and air dried. The specific viscosity of the polymer (0.5 part/100 parts of solution) at 30° C. is 0.24 as compared to a specific viscosity of 0.07 for the monomer.

In ascertaining the molecular weight, it is known that the molecular weight (M) of a polymer is related conveniently to intrinsic viscosity (N) by an equation of the form: $(N)=kM^a$. Here "$k$" and "$a$" are constants whose value is determined by separate experiments in which molecular weight is measured by light scattering or by a similar absolute method. Information of this kind is given in various standard reference books on high polymers.

In the case of polyacrylamide, more detailed information on the relationship between intrinsic viscosity and molecular weight may be found in a publication of American Cyanamid Company, 30 Rockefeller Plaza, New York 20, New York, New Product Bulletin, No. 34, entitled Polyacrylamide, published in June 1955. The relation between the "intrinsic viscosity" and the weight average molecular weight is previously established by light-scattering measurements on a set of eight samples of pure polyacrylamide, in 0.025 N HCl ranging in weight average molecular weight from 78,700 to 1,640,000. The light-scattering measurements are performed on solutions filtered through ultrafine sintered glass and are interpreted by standard light-scattering procedures and corrected by determinations of dissymmetries and depolarization ratios. Intrinsic viscosities of aqueous solutions are determined from flow times in an Ostwald viscometer at 30° C.

The polymeric and copolymeric acrylamides prepared by the process of the present invention ordinarily have a molecular weight (weight average molecular weight) in excess of 10,000. Generally the molecular weight is within the range of about 100,000 to 400,000. Molecular weights of other polymers will vary depending on such factors as monomer structure and polymerization temperature.

It will be understood by those skilled in the art that our invention is not limited to the specific monomers and methods of effecting polymerization that are given by way of illustration in the foregoing examples. Thus, various other monomers which have the characteristic of being solid at room temperature, which have a melting point in excess of about 35° C. which are readily polymerizable with free radical catalysts and which are insoluble in a suitable medium may be utilized in practicing the present invention. Illustrative examples of suitable monomers are such as acrylamide, methylol acrylamide, methacrylamide, methylene-bis-acrylamide, vinyl carbazole, vinyl stearate, acrylic acid, methacrylic acid and the various salts of these acids such as potassium, calcium and barium acrylates, N-substituted acrylamides and methacrylamides, allyl amine salts and other polymerizable amine salts.

The advantages of the present invention will be immediately apparent to those skilled in the art from the foregoing description. The invention broadens the field of utility of polyacrylamide, since it avoids the presence of a solvent which must be removed and makes the resulting compositions suitable in applications for which aqueous solutions of polyacrylamide would be entirely unsuited. In cases where the polymer (e.g. polyvinyl carbazole) is to be used in electrical applications, the present process is preferred over aqueous processes. The latter usually introduce undesirable ionic impurities derived from the salt-like catalysts commonly used in aqueous systems.

As a result of the present invention, all of the inherent advantages of a nonaqueous solvent can be utilized in working with polymers and copolymers. Polyacrylamide and copolymers of acrylamide containing at least about 75% of acrylamide combined in the polymer molecule have been found to have excellent properties for the various uses set forth in the aforementioned bulletin on polyacrylamide. For instance, the invention provides compositions which can be extruded or otherwise shaped to form useful articles of manufacture. The compositions of the present invention are also useful in warp-sizing and other textile-treating applications, as well as in adhesive compositions, ceramic binders, nitrocellulose lacquers, as components of rubber-based glues, in furniture glues which are capable of withstanding freeze-thaw cycles, and for various other purposes, examples of which have been given hereinbefore.

We claim:

1. A process for preparing solid polymers which comprises polymerizing vinyl monomers having a melting point above 35° C. and selected from the group consisting of acrylamide, methylol acrylamide, methacrylamide, methylene bisacrylamide, vinyl carbazole, vinyl stearate, acrylic acid, methacrylic acid, potassium, calcium and barium salts of said acids, and allyl amine salts with a free radical polymerization catalyst in the solid state and below their melting point, said polymerization being conducted in a non-aqueous medium, said medium being an inert liquid organic nonsolvent for said monomers and for said polymers and having a boiling point in the range of from about 50° C. to about 110° C.

2. The process of claim 1 wherein the monomer is acrylamide.

3. The process of claim 1 wherein the monomer is methylol acrylamide.

4. A process for preparing solid polyacrylamide which comprises polymerizing solid acrylamide, with a free radical polymerization catalyst, and at a temperature below its melting point in an essentially anhydrous liquid polymerizing medium comprising hexane.

5. A process for preparing solid polyacrylamide which comprises polymerizing solid acrylamide with a free radical polymerization catalyst and at a temperature below its melting point in a non-aqueous hydrocarbon medium, said hydrocarbon medium being an inert nonsolvent for acrylamide and for polyacrylamide and having a boiling point in the range of from about 50° C. to 110° C.

6. A process for preparing solid polymethylol acrylamide which comprises polymerizing solid methylol acrylamide with a free radical polymerization catalyst and hydrocarbon medium, said hydrocarbon medium being an inert nonsolvent for methylol acrylamide and for polymethylol acrylamide and having a boiling point in the range of from about 50° C. to 110° C.

References Cited in the file of this patent

UNITED STATES PATENTS

| | | |
|---|---|---|
| 2,471,959 | Hunt | May 31, 1949 |
| 2,521,902 | Coover et al. | Sept. 12, 1950 |
| 2,584,306 | Theobald | Feb. 5, 1952 |
| 2,672,480 | Matlack | Mar. 16, 1954 |
| 2,743,297 | Husted | Apr. 24, 1956 |
| 2,769,786 | Szwarc et al. | Nov. 6, 1956 |
| 2,831,841 | Jones | Apr. 27, 1958 |
| 2,904,541 | Barratt | Sept. 15, 1959 |

FOREIGN PATENTS

| | | |
|---|---|---|
| 648,252 | Great Britain | Jan. 3, 1951 |

OTHER REFERENCES

Schildknecht: Polymer Processes, New York, Interscience Publishers, Inc., 1956, 914 pages.

UNITED STATES PATENT OFFICE
CERTIFICATION OF CORRECTION

Patent No. 2,953,546 September 20, 1960

Walter M. Thomas et al.

It is hereby certified that error appears in the above numbered patent requiring correction and that the said Letters Patent should read as corrected below.

Column 3, line 70, after "part" insert -- insoluble --; column 6, line 10, after "and" insert -- at a temperature below its melting point in a non-aqueous --.

Signed and sealed this 6th day of June 1961.

(SEAL)
Attest:

ERNEST W. SWIDER
Attesting Officer

DAVID L. LADD
Commissioner of Patents